US009276484B2

(12) United States Patent
Muto

(10) Patent No.: US 9,276,484 B2
(45) Date of Patent: Mar. 1, 2016

(54) POWER CONVERSION APPARATUS THAT ADJUSTS THE POWER TRANSMITTED BETWEEN A PRIMARY SIDE CIRCUIT AND A SECONDARY SIDE CIRCUIT AND METHOD OF THE SAME

(71) Applicant: Toyota Jidosha Kabushiki Kaisha, Toyota-shi, Aichi-ken (JP)

(72) Inventor: Jun Muto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/282,465

(22) Filed: May 20, 2014

(65) Prior Publication Data

US 2014/0347891 A1    Nov. 27, 2014

(30) Foreign Application Priority Data

May 21, 2013    (JP) .................................. 2013-107414

(51) Int. Cl.
H02M 3/335    (2006.01)

(52) U.S. Cl.
CPC ...... *H02M 3/33584* (2013.01); *H02M 3/33561* (2013.01); *H02M 3/3353* (2013.01)

(58) Field of Classification Search
CPC .......................... H02M 3/3353; H02M 3/33584
See application file for complete search history.

(56) References Cited

U.S. PATENT DOCUMENTS

| 5,088,017 | A  | * | 2/1992 | Yaginuma et al. | ......... 363/21.04 |
|---|---|---|---|---|---|
| 7,298,634 | B2 | * | 11/2007 | Yasumura | ....................... 363/24 |
| 8,503,200 | B2 | * | 8/2013 | Chapman et al. | ............... 363/41 |
| 2003/0043601 | A1 |  | 3/2003 | Balakrishnan et al. | |
| 2006/0126364 | A1 | * | 6/2006 | Yasumura | ...................... 363/16 |
| 2007/0024255 | A1 | * | 2/2007 | Yasumura | .................... 323/267 |
| 2011/0128758 | A1 | * | 6/2011 | Ueno et al. | ...................... 363/17 |
| 2011/0198933 | A1 |  | 8/2011 | Ishigaki et al. | |
| 2012/0134187 | A1 | * | 5/2012 | Sutardja et al. | ................. 363/89 |

FOREIGN PATENT DOCUMENTS

| JP | 10210733 A | 8/1998 |
|---|---|---|
| JP | 11027946 A | 1/1999 |
| JP | 2009-183145 A | 8/2009 |
| JP | 2009-201242 A | 9/2009 |
| JP | 2011-193713 A | 9/2011 |

* cited by examiner

*Primary Examiner* — Timothy J Dole
*Assistant Examiner* — Ishrat Jamali
(74) *Attorney, Agent, or Firm* — Dinsmore & Shohl LLP

(57) ABSTRACT

A power conversion apparatus includes a primary side circuit, a secondary side circuit that is connected to the primary side circuit through a reactor and magnetically coupled thereto through a transformer, and a control unit that adjusts power transmitted between the primary side circuit and the secondary side circuit by changing a phase difference between switching of the primary side circuit and switching of the secondary side circuit. The control unit adjusts the frequency of switching of the primary side circuit and the secondary side circuit according to the value of an equivalent inductance of the reactor and the transformer.

9 Claims, 3 Drawing Sheets

POWER CONVERSION APPARATUS THAT ADJUSTS THE POWER TRANSMITTED BETWEEN A PRIMARY SIDE CIRCUIT AND A SECONDARY SIDE CIRCUIT AND METHOD OF THE SAME

INCORPORATION BY REFERENCE

The disclosure of Japanese Patent Application No. 2013-107414 filed on May 21, 2013 including the specification, drawings and abstract is incorporated herein by reference in its entirety.

BACKGROUND OF THE INVENTION

1. Field of the Invention

The invention relates to power conversion performed between a primary side circuit and a secondary side circuit that is connected to the primary side circuit through a reactor and magnetically coupled thereto through a transformer.

2. Description of Related Art

A conventional power conversion apparatus can adjust an amount of power transmitted between a primary side circuit and a secondary side circuit by changing a phase difference between switching of the primary side circuit and switching of the secondary side circuit (see Japanese Patent Application Publication No. 2011-193713 (JP 2011-193713 A), for example).

SUMMARY OF THE INVENTION

However, the spread in inductance of the transformer or reactor causes a spread in the power transmitted between the primary side circuit and secondary side circuit. It is an object of the invention to provide a power conversion apparatus and a power correction method that can inhibit changes in the power transmitted between the primary side circuit and secondary side circuit.

A first aspect of the invention relates to a power conversion apparatus including: a primary side circuit; a secondary side circuit that is connected to the primary side circuit through a reactor and magnetically coupled thereto through a transformer; and a control unit that adjusts power transmitted between the primary side circuit and the secondary side circuit by changing a phase difference between switching of the primary side circuit and switching of the secondary side circuit. In the power conversion apparatus, the control unit adjusts a frequency of switching of the primary side circuit and the secondary side circuit according to a value of an equivalent inductance of the reactor and the transformer.

A second aspect of the invention relates to a power correction method for correcting power that is transmitted between a primary side circuit and a secondary side circuit that is connected to the primary side circuit through a reactor and magnetically coupled thereto through a transformer, and that is adjusted according to a phase difference between switching of the primary side circuit and switching of the secondary side circuit. The power correction method includes: a measurement step of measuring an equivalent inductance of the reactor and the transformer; and an adjustment step of adjusting a frequency of switching of the primary side circuit and the secondary side circuit according to a measured value of the equivalent inductance.

The "frequency" can be paraphrased as "angular frequency", and "adjustment of frequency" can be paraphrased as "adjustment of angular frequency".

According to the first and second aspects of the invention, the change in the power transmitted between the primary side circuit and the secondary side circuit can be inhibited.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
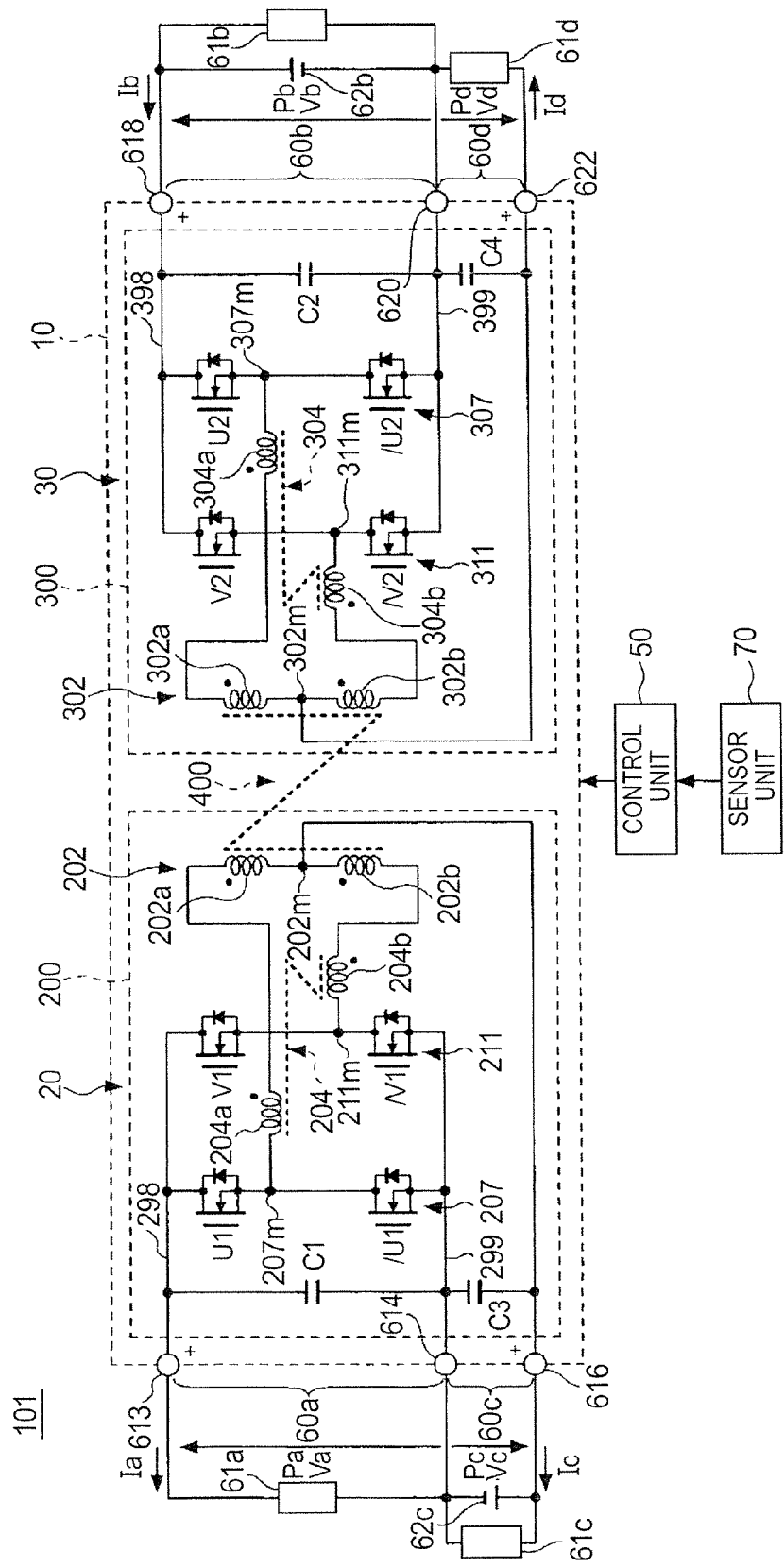
FIG. 1 is a block diagram showing an example of a configuration of a power supply apparatus serving as an embodiment of a power conversion apparatus according to the invention.

FIG. 1 is a block diagram showing an example of a configuration of a power supply apparatus 101 serving as an embodiment of a power conversion apparatus. For example, the power supply apparatus 101 is a power supply system that includes a power supply circuit 10, a control unit 50, and a sensor unit 70.

For example, the power supply apparatus 101 includes, as primary side ports, a first input/output port 60a to which a primary side high voltage system load 61a is connected and a second input/output port 60c to which a primary side low voltage system load 61c and a primary side low voltage system power supply 62c are connected. The primary side low voltage system power supply 62c supplies power to the primary side low voltage system load 61c, which is operated by an identical voltage system (a 12 V system, for example) to the primary side low voltage system power supply 62c. Further, the primary side low voltage system power supply 62c supplies power stepped up by a primary side conversion circuit 20 provided in the power supply circuit 10 to the primary side high voltage system load 61a, which is operated by a different voltage system (a higher 48 V system than the 12 V system, for example) to the primary side low voltage system power supply 62c. A secondary battery such as a lead battery may be cited as a specific example of the primary side low voltage system power supply 62c.

For example, the power supply apparatus 101 includes, as secondary side ports, a third input/output port 60b to which a secondary side high voltage system load 61b and a secondary side high voltage system power supply 62b are connected and a fourth input/output port 60d to which a secondary side low voltage system load 61d is connected. The secondary side high voltage system power supply 62b supplies power to the secondary side high voltage system load 61b, which is operated by an identical voltage system (a higher 288 V system than the 12 V system and the 48 V system, for example) to the secondary side high voltage system power supply 62b. Further, the secondary side high voltage system power supply 62b supplies power stepped down by a secondary side conversion circuit 30 provided in the power supply circuit 10 to the secondary side low voltage system load 61d, which is operated by a different voltage system (a lower 72 V system than the 288 V system, for example) to the secondary side high voltage system power supply 62b. A secondary battery such as a lithium ion battery may be cited as a specific example of the secondary side high voltage system power supply 62b.

The power supply circuit 10 is a power conversion circuit that includes the four input/output ports described above and has functions for selecting two desired input/output ports from the four input/output ports and performing power conversion between the two selected input/output ports.

Powers Pa, Pc, Pb, Pd are input/output powers (input powers or output powers) of the first input/output port 60a, the second input/output port 60c, the third input/output port 60b, and the fourth input/output port 60d, respectively. Voltages Va, Vc, Vb, Vd are input/output voltages (input voltages or output voltages) of the first input/output port 60a, the second input/output port 60c, the third input/output port 60b, and the fourth input/output port 60d, respectively. Currents Ia, Ic, Ib, Id are input/output currents (input currents or output currents) of the first input/output port 60a, the second input/output port 60c, the third input/output port 60b, and the fourth input/output port 60d, respectively.

The power supply circuit 10 includes a capacitor C1 provided in the first input/output port 60a, a capacitor C3 provided in the second input/output port 60c, a capacitor C2 provided in the third input/output port 60b, and a capacitor C4 provided in the fourth input/output port 60d. Film capacitors, aluminum electrolytic capacitors, ceramic capacitors, polymer electrolytic capacitors, and so on may be cited as specific examples of the capacitors C1, C2, C3, C4.

The capacitor C1 is inserted between a high potential side terminal 613 of the first input/output port 60a and a low potential side terminal 614 of the first input/output port 60a and the second input/output port 60c. The capacitor C3 is inserted between a high potential side terminal 616 of the second input/output port 60c and the low potential side terminal 614 of the first input/output port 60a and the second input/output port 60c. The capacitor C2 is inserted between a high potential side terminal 618 of the third input/output port 60b and a low potential side terminal 620 of the third input/output port 60b and the fourth input/output port 60d. The capacitor C4 is inserted between a high potential side terminal 622 of the fourth input/output port 60d and the low potential side terminal 620 of the third input/output port 60b and the fourth input/output port 60d.

The capacitors C1, C2, C3, C4 may be provided either inside or outside the power supply circuit 10.

The power supply circuit 10 is a power conversion circuit configured to include the primary side conversion circuit 20 and the secondary side conversion circuit 30. Note that the primary side conversion circuit 20 and the secondary side conversion circuit 30 are connected via a primary side magnetic coupling reactor 204 and a secondary side magnetic coupling reactor 304, and magnetically coupled by a transformer 400 (a center tapped transformer).

The primary side conversion circuit 20 is a primary side circuit configured to include a primary side full bridge circuit 200, the first input/output port 60a, and the second input/output port 60c. The primary side full bridge circuit 200 is a primary side power conversion unit configured to include a primary side coil 202 of the transformer 400, the primary side magnetic coupling reactor 204, a primary side first upper arm U1, a primary side first lower arm /U1, a primary side second upper arm V1, and a primary side second lower arm /V1. Here, the primary side first upper arm U1, the primary side first lower arm /U1, the primary side second upper arm V1, and the primary side second lower arm /V1 are constituted by switching elements respectively configured to include, for example, an N channel type metal oxide semiconductor field effect transistor (MOSFET) and a body diode serving as a parasitic element of the MOSFET. Additional diodes may be connected to the MOSFET in parallel.

The primary side full bridge circuit 200 includes a primary side positive electrode bus line 298 connected to the high potential side terminal 613 of the first input/output port 60a, and a primary side negative electrode bus line 299 connected to the low potential side terminal 614 of the first input/output port 60a and the second input/output port 60c.

A primary side first arm circuit 207 connecting the primary side first upper arm U1 and the primary side first lower arm /U1 in series is attached between the primary side positive electrode bus line 298 and the primary side negative electrode bus line 299. The primary side first arm circuit 207 is a primary side first power conversion circuit unit (a primary side U phase power conversion circuit unit) capable of performing a power conversion operation by switching the primary side first upper arm U1 and the primary side first lower arm /U1 ON and OFF. Further, a primary side second arm circuit 211 connecting the primary side second upper arm V1 and the primary side second lower arm /V1 in series is attached between the primary side positive electrode bus line 298 and the primary side negative electrode bus line 299 in parallel with the primary side first arm circuit 207. The primary side second arm circuit 211 is a primary side second power conversion circuit unit (a primary side V phase power conversion circuit unit) capable of performing a power conversion operation by switching the primary side second upper aim V1 and the primary side second lower arm /V1 ON and OFF.

The primary side coil 202 and the primary side magnetic coupling reactor 204 are provided in a bridge part connecting a midpoint 207m of the primary side first arm circuit 207 to a midpoint 211m of the primary side second arm circuit 211. To describe connection relationships to the bridge part in more detail, one end of a primary side first reactor 204a of the primary side magnetic coupling reactor 204 is connected to the midpoint 207m of the primary side first arm circuit 207, and one end of the primary side coil 202 is connected to another end of the primary side first reactor 204a. Further, one end of a primary side second reactor 204b of the primary side magnetic coupling reactor 204 is connected to another end of the primary side coil 202, and another end of the primary side second reactor 204b is connected to the midpoint 211m of the primary side second arm circuit 211. Note that the primary side magnetic coupling reactor 204 is configured to include the primary side first reactor 204a and the primary side second reactor 204b, which is magnetically coupled to the primary side first reactor 204a by a coupling coefficient $k_1$.

The midpoint 207m is a primary side first intermediate node between the primary side first upper arm U1 and the primary side first lower arm /U1, and the midpoint 211m is a primary side second intermediate node between the primary side second upper arm V1 and the primary side second lower arm /V1.

The first input/output port 60a is a port provided between the primary side positive electrode bus line 298 and the primary side negative electrode bus line 299. The first input/output port 60a is configured to include the terminal 613 and the terminal 614. The second input/output port 60c is a port provided between the primary side negative electrode bus line 299 and a center tap 202m of the primary side coil 202. The second input/output port 60c is configured to include the terminal 614 and the terminal 616.

The center tap 202m is connected to the high potential side terminal 616 of the second input/output port 60c. The center tap 202m is an intermediate connection point between a primary side first winding 202a and a primary side second winding 202b constituting the primary side coil 202.

The secondary side conversion circuit 30 is a secondary side circuit configured to include a secondary side full bridge circuit 300, the third input/output port 60b, and the fourth input/output port 60d. The secondary side full bridge circuit 300 is a secondary side power conversion unit configured to include a secondary side coil 302 of the transformer 400, the secondary side magnetic coupling reactor 304, a secondary side first upper arm U2, a secondary side first lower arm /U2, a secondary side second upper arm V2, and a secondary side second lower arm /V2. Here, the secondary side first upper arm U2, the secondary side first lower arm /U2, the secondary side second upper arm V2, and the secondary side second lower arm /V2 are constituted by switching elements respectively configured to include, for example, an N channel type MOSFET and a body diode serving as a parasitic element of the MOSFET. Additional diodes may be connected to the MOSFET in parallel.

The secondary side full bridge circuit 300 includes a secondary side positive electrode bus line 398 connected to the high potential side terminal 618 of the third input/output port 60b, and a secondary side negative electrode bus line 399 connected to the low potential side terminal 620 of the third input/output port 60b and the fourth input/output port 60d.

A secondary side first arm circuit 307 connecting the secondary side first upper arm U2 and the secondary side first lower arm /U2 in series is attached between the secondary side positive electrode bus line 398 and the secondary side negative electrode bus line 399. The secondary side first arm circuit 307 is a secondary side first power conversion circuit unit (a secondary side U phase power conversion circuit unit) capable of performing a power conversion operation by switching the secondary side first upper arm U2 and the secondary side first lower arm /U2 ON and OFF. Further, a secondary side second arm circuit 311 connecting the secondary side second upper arm V2 and the secondary side second lower arm /V2 in series is attached between the secondary side positive electrode bus line 398 and the secondary side negative electrode bus line 399 in parallel with the secondary side first arm circuit 307. The secondary side second arm circuit 311 is a secondary side second power conversion circuit unit (a secondary side V phase power conversion circuit unit) capable of performing a power conversion operation by switching the secondary side second upper arm V2 and the secondary side second lower arm /V2 ON and OFF.

The secondary side coil 302 and the secondary side magnetic coupling reactor 304 are provided in a bridge part connecting a midpoint 307m of the secondary side first arm circuit 307 to a midpoint 311m of the secondary side second arm circuit 311. To describe connection relationships to the bridge part in more detail, one end of a secondary side first reactor 304a of the secondary side magnetic coupling reactor 304 is connected to the midpoint 307m of the secondary side first arm circuit 307, and one end of the secondary side coil 302 is connected to another end of the secondary side first reactor 304a. Further, one end of a secondary side second reactor 304b of the secondary side magnetic coupling reactor 304 is connected to another end of the secondary side coil 302, and another end of the secondary side second reactor 304b is connected to the midpoint 311m of the secondary side second arm circuit 311. Note that the secondary side magnetic coupling reactor 304 is configured to include the secondary side first reactor 304a and the secondary side second reactor 304b, which is magnetically coupled to the secondary side first reactor 304a by a coupling coefficient $k_2$.

The midpoint 307m is a secondary side first intermediate node between the secondary side first upper arm U2 and the secondary side first lower arm /U2, and the midpoint 311m is a secondary side second intermediate node between the secondary side second upper arm V2 and the secondary side second lower arm /V2.

The third input/output port 60b is a port provided between the secondary side positive electrode bus line 398 and the secondary side negative electrode bus line 399. The third input/output port 60b is configured to include the terminal 618 and the terminal 620. The fourth input/output port 60d is a port provided between the secondary side negative electrode bus line 399 and a center tap 302m of the secondary side coil 302. The fourth input/output port 60d is configured to include the terminal 620 and the terminal 622.

The center tap 302m is connected to the high potential side terminal 622 of the fourth input/output port 60d. The center tap 302m is an intermediate connection point between a secondary side first winding 302a and a secondary side second winding 302b constituting the secondary side coil 302.

In FIG. 1, the power supply apparatus 101 includes the sensor unit 70. The sensor unit 70 serves as detecting means that detects an input/output value Y of at least one of the first to fourth input/output ports 60a, 60c, 60b, 60d at predetermined detection period intervals and outputs a detection value Yd corresponding to the detected input/output value Y to the control unit 50. The detection value Yd may be a detected voltage obtained by detecting the input/output voltage, a detected current obtained by detecting the input/output current, or a detected power obtained by detecting the input/output power. The sensor unit 70 may be provided either inside or outside the power supply circuit 10.

The sensor unit 70 includes, for example, a voltage detection unit that detects the input/output voltage generated in at least one of the first to fourth input/output ports 60a, 60c, 60b, 60d. For example, the sensor unit 70 includes a primary side voltage detection unit that outputs at least one detected voltage from among an input/output voltage Va and an input/output voltage Vc as a primary side voltage detection value, and a secondary side voltage detection unit that outputs at least one detected voltage from among an input/output voltage Vb and an input/output voltage Vd as a secondary side voltage detection value.

The voltage detection unit of the sensor unit 70 includes, for example, a voltage sensor that monitors an input/output voltage value of at least one port, and a voltage detection circuit that outputs a detected voltage corresponding to the input/output voltage value monitored by the voltage sensor to the control unit 50.

The sensor unit 70 includes, for example, a current detection unit that detects the input/output current flowing through at least one of the first to fourth input/output ports 60a, 60c, 60b, 60d. For example, the sensor unit 70 includes a primary side current detection unit that outputs at least one detected current from among an input/output current Ia and an input/output current Ic as a primary side current detection value, and a secondary side current detection unit that outputs at least one detected current from among an input/output current Ib and an input/output current Id as a secondary side current detection value.

The current detection unit of the sensor unit 70 includes, for example, a current sensor that monitors an input/output current value of at least one port, and a current detection circuit that outputs a detected current corresponding to the input/output current value monitored by the current sensor to the control unit 50.

The power supply apparatus 101 includes the control unit 50. For example, the control unit 50 is an electronic circuit that includes a microcomputer having an inbuilt central processing unit (CPU). The control unit 50 may be provided either inside or outside the power supply circuit 10.

The control unit 50 feedback-controls a power conversion operation performed by the power supply circuit 10 such that the detected value Yd of the input/output value Y of at least one of the first to fourth input/output ports 60a, 60c, 60b, 60d converges to a target value Yo set in the port. For example, the target value Yo is a command value set by the control unit 50 or a predetermined apparatus other than the control unit 50 on the basis of driving conditions defined in relation to the respective loads (the primary side low voltage system load 61c and so on, for example) connected to the input/output ports. The target value Yo functions as an output target value when power is output from the port and an input target value when power is input into the port, and may be a target voltage value, a target current value, or a target power value.

Further, the control unit 50 feedback-controls the power conversion operation performed by the power supply circuit 10 such that a transmitted power P transmitted between the primary side conversion circuit 20 and the secondary side conversion circuit 30 via the transformer 400 converges to a set target transmitted power Po. The transmitted power will also be referred to as a power transmission amount. For example, the target transmitted power Po is a command value set by the control unit 50 or a predetermined apparatus other than the control unit 50 on the basis of a deviation between the detected value Yd and the target value Yo in one of the ports.

The control unit 50 feedback-controls the power conversion operation performed by the power supply circuit 10 by varying a value of a predetermined control parameter X, and is thus capable of adjusting the respective input/output values Y of the first to fourth input/output ports 60a, 60c, 60b, 60d of the power supply circuit 10. Two control variables, namely a phase difference $\phi$ and a duty ratio D (an ON time $\delta$) are used as the main control parameters X.

The phase difference $\phi$ is a deviation (a time lag) between switching timings of identical-phase power conversion circuit units of the primary side full bridge circuit 200 and the secondary side full bridge circuit 300. The duty ratio D (the ON time $\delta$) is a duty ratio (an ON time) between switching waveforms of the respective power conversion circuit units constituting the primary side full bridge circuit 200 and the secondary side full bridge circuit 300.

The two control parameters X can be controlled independently of each other. The control unit 50 varies the input/output values Y of the respective input/output ports of the power supply circuit 10 by performing duty ratio control and/or phase control on the primary side full bridge circuit 200 and the secondary side full bridge circuit 300 using the phase difference $\phi$ and the duty ratio D (the ON time $\delta$).

Figure 2:
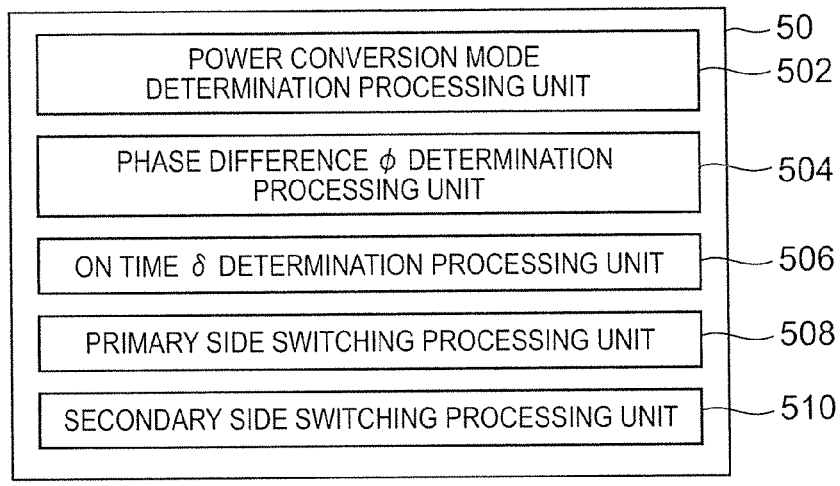
FIG. 2 is a block diagram showing an example of a configuration of a control unit according to this embodiment.

FIG. 2 is a block diagram of the control unit 50. The control unit 50 is a control unit having a function for performing switching control on the respective switching elements of the primary side conversion circuit 20, such as the primary side first upper arm U1, and the respective switching elements of the secondary side conversion circuit 30, such as the secondary side first upper arm U2. The control unit 50 is configured to include a power conversion mode determination processing unit 502, a phase difference $\phi$ determination processing unit 504, an ON time $\delta$ determination processing unit 506, a primary side switching processing unit 508, and a secondary side switching processing unit 510. For example, the control unit 50 is an electronic circuit that includes a microcomputer having an inbuilt CPU.

For example, the power conversion mode determination processing unit 502 selects and sets an operating mode from among power conversion modes A to L of the power supply circuit 10, to be described below, on the basis of a predetermined external signal (for example, a signal indicating the deviation between the detected value Yd and the target value Yo in one of the ports). As regards the power conversion modes, in mode A, power input from the first input/output port 60a is converted and output to the second input/output port 60c. In mode B, power input from the first input/output port 60a is converted and output to the third input/output port 60b. In mode C, power input from the first input/output port 60a is converted and output to the fourth input/output port 60d.

In mode D, power input from the second input/output port 60c is converted and output to the first input/output port 60a. In mode E, power input from the second input/output port 60c is converted and output to the third input/output port 60b. In mode F, power input from the second input/output port 60c is converted and output to the fourth input/output port 60d.

In mode G, power input from the third input/output port 60b is converted and output to the first input/output port 60a. In mode H, power input from the third input/output port 60b is converted and output to the second input/output port 60c. In mode I, power input from the third input/output port 60b is converted and output to the fourth input/output port 60d.

In mode J, power input from the fourth input/output port 60d is converted and output to the first input/output port 60a. In mode K, power input from the fourth input/output port 60d is converted and output to the second input/output port 60c. In mode L, power input from the fourth input/output port 60d is converted and output to the third input/output port 60b.

The phase difference $\phi$ determination processing unit 504 has a function for setting a phase difference $\phi$ between switching period motions of the switching elements between the primary side conversion circuit 20 and the secondary side conversion circuit 30 in order to cause the power supply circuit 10 to function as a direct current-direct current (DC-DC) converter circuit.

The ON time $\delta$ determination processing unit 506 has a function for setting an ON time $\delta$ of the switching elements of the primary side conversion circuit 20 and the secondary side conversion circuit 30 in order to cause the primary side conversion circuit 20 and the secondary side conversion circuit 30 to function respectively as step-up/step-down circuits.

The primary side switching processing unit 508 has a function for performing switching control on the respective switching elements constituted by the primary side first upper arm U1, the primary side first lower arm /U1, the primary side second upper arm V1, and the primary side second lower arm /V1, on the basis of outputs of the power conversion mode determination processing unit 502, the phase difference $\phi$ determination processing unit 504, and the ON time $\delta$ determination processing unit 506.

The secondary side switching processing unit 510 has a function for performing switching control on the respective switching elements constituted by the secondary side first upper arm U2, the secondary side first lower arm /U2, the secondary side second upper arm V2, and the secondary side second lower arm /V2, on the basis of the outputs of the power conversion mode determination processing unit 502, the phase difference $\phi$ determination processing unit 504, and the ON time $\delta$ determination processing unit 506.

An operation of the power supply apparatus 101 having the above configuration will now be described using FIGS. 1 and 2. When, for example, an external signal requesting an operation in which the power conversion mode of the power supply circuit 10 is set at mode F is input, the power conversion mode determination processing unit 502 of the control unit 50 sets the power conversion mode of the power supply circuit 10 to mode F. At this time, a voltage input into the second input/output port 60c is stepped up by a step-up function of the primary side conversion circuit 20, whereupon power having the stepped-up voltage is transmitted to the third input/output port 60b side by a DC-DC converter circuit function of the power supply circuit 10, stepped down by a step-down function of the secondary side conversion circuit 30, and then output from the fourth input/output port 60d.

Here, a step-up/step-down function of the primary side conversion circuit 20 will be described in detail. Focusing on the second input/output port 60c and the first input/output port 60a, the terminal 616 of the second input/output port 60c is connected to the midpoint 207m of the primary side first arm circuit 207 via the primary side first winding 202a and the primary side first reactor 204a connected in series to the primary side first winding 202a. Respective ends of the primary side first arm circuit 207 are connected to the first input/output port 60a, and as a result, a step-up/step-down circuit is attached between the terminal 616 of the second input/output port 60c and the first input/output port 60a.

The terminal 616 of the second input/output port 60c is also connected to the midpoint 211m of the primary side second arm circuit 211 via the primary side second winding 202b and the primary side second reactor 204b connected in series to the primary side second winding 202b. Respective ends of the primary side second arm circuit 211 are connected to the first input/output port 60a, and as a result, a step-up/step-down circuit is attached in parallel between the terminal 616 of the second input/output port 60c and the first input/output port 60a. Note that since the secondary side conversion circuit 30 is a circuit having a substantially identical configuration to the primary side conversion circuit 20, two step-up/step-down circuits are likewise connected in parallel between the terminal 622 of the fourth input/output port 60d and the third input/output port 60b. Hence, the secondary side conversion circuit 30 has an identical step-up/step-down function to the primary side conversion circuit 20.

Next, the function of the power supply circuit 10 as a DC-DC converter circuit will be described in detail. Focusing on the first input/output port 60a and the third input/output port 60b, the primary side full bridge circuit 200 is connected to the first input/output port 60a, and the secondary side full bridge circuit 300 is connected to the third input/output port 60b. When the primary side coil 202 provided in the bridge part of the primary side full bridge circuit 200 and the secondary side coil 302 provided in the bridge part of the secondary side full bridge circuit 300 are magnetically coupled by a coupling coefficient $k_T$, the transformer 400 functions as a center tapped transformer having a number of windings 1:N. Hence, by adjusting the phase difference φ between the switching period motions of the switching elements in the primary side full bridge circuit 200 and the secondary side full bridge circuit 300, power input into the first input/output port 60a can be converted and transmitted to the third input/output port 60b or power input into the third input/output port 60b can be converted and transmitted to the first input/output port 60a.

Figure 3:
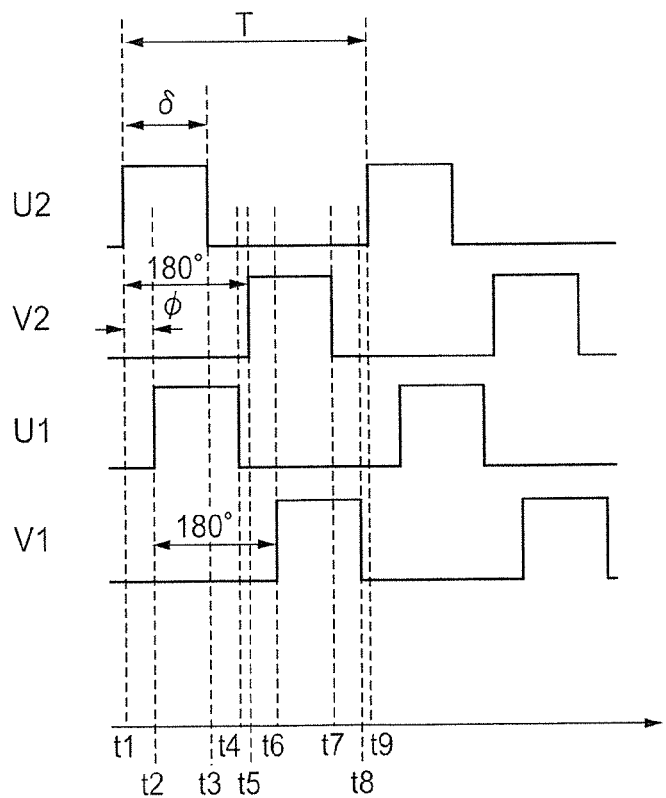
FIG. 3 is a timing chart showing an example of switching operations of a primary side circuit and a secondary side circuit according to this embodiment.

FIG. 3 is a view showing a timing chart of ON/OFF switching waveforms of the respective arms provided in the power supply circuit 10 resulting from control executed by the control unit 50. In FIG. 3, U1 is an ON/OFF waveform of the primary side first upper arm U1, V1 is an ON/OFF waveform of the primary side second upper arm V1, U2 is an ON/OFF waveform of the secondary side first upper arm U2, and V2 is an ON/OFF waveform of the secondary side second upper arm V2. ON/OFF waveforms of the primary side first lower arm /U1, the primary side second lower arm /V1, the secondary side first lower arm /U2, and the secondary side second lower arm /V2 are inverted waveforms (not shown) obtained by respectively inverting the ON/OFF waveforms of the primary side first upper arm U1, the primary side second upper arm V1, the secondary side first upper arm U2, and the secondary side second upper arm V2. Note that dead time is preferably provided between the respective ON/OFF waveforms of the upper and lower arms to prevent a through current from flowing when both the upper and lower arms are switched ON. Further, in FIG. 3, a high level indicates an ON condition and a low level indicates an OFF condition.

Here, by modifying the respective ON times δ of U1, V1, U2, and V2, step-up/step-down ratios of the primary side conversion circuit 20 and the secondary side conversion circuit 30 can be modified. For example, by making the respective ON times δ of U1, V1, U2, and V2 equal to each other, the step-up/step-down ratio of the primary side conversion circuit 20 can be made equal to the step-up/step-down ratio of the secondary side conversion circuit 30.

The ON time δ determination processing unit 506 make the respective ON times δ of U1, V1, U2, and V2 equal to each other (respective ON times δ=primary side ON time δ1=secondary side ON time δ2=time value α) so that the respective step-up/step-down ratios of the primary side conversion circuit 20 and the secondary side conversion circuit 30 are equal to each other.

The step-up/step-down ratio of the primary side conversion circuit 20 is determined by the duty ratio D, which is a proportion of a switching period T of the switching elements (arms) constituting the primary side full bridge circuit 200 occupied by the ON time δ. Similarly, the step-up/step-down ratio of the secondary side conversion circuit 30 is determined by the duty ratio D, which is a proportion of the switching period T of the switching elements (arms) constituting the secondary side full bridge circuit 300 occupied by the ON time δ. The step-up/step-down ratio of the primary side conversion circuit 20 is a transformation ratio between the first input/output port 60a and the second input/output port 60c, while the step-up/step-down ratio of the secondary side conversion circuit 30 is a transformation ratio between the third input/output port 60b and the fourth input/output port 60d.

Therefore, for example, the step-up/step-down ratio of the primary side conversion circuit 20

=the voltage of the second input/output port 60c/the voltage of the first input/output port 60a

=δ1/T=α/T, and the step-up/step-down ratio of the secondary side conversion circuit 30

=the voltage of the fourth input/output port 60d/the voltage of the third input/output port 60b

=δ2/T=α/T.

In other words, the respective step-up/step-down ratios of the primary side conversion circuit 20 and the secondary side conversion circuit 30 take identical values (=α/T).

Note that the ON time δ in FIG. 3 represents both the ON time δ1 of the primary side first upper arm U11 and the primary side second upper arm V1 and the ON time δ2 of the secondary side first upper arm U2 and the secondary side second upper arm V2. Further, the switching period T of the anus constituting the primary side full bridge circuit 200 and the switching period T of the arms constituting the secondary side full bridge circuit 300 are equal times.

Furthermore, a phase difference between U1 and V1 is activated at 180 degrees ($\pi$), and a phase difference between U2 and V2 is likewise activated at 180 degrees ($\pi$). Moreover, by changing the phase difference $\phi$ between U1 and U2, the power transmission amount P between the primary side conversion circuit 20 and the secondary side conversion circuit 30 can be adjusted such that when the phase difference $\phi>0$, power can be transmitted from the primary side conversion circuit 20 to the secondary side conversion circuit 30, and when the phase difference $\phi<0$, power can be transmitted from the secondary side conversion circuit 30 to the primary side conversion circuit 20.

The phase difference $\phi$ is a deviation (a time lag) between the switching timings of identical-phase power conversion circuit units of the primary side full bridge circuit 200 and the secondary side full bridge circuit 300. For example, the phase difference $\phi$ is a deviation between the switching timings of the primary side first arm circuit 207 and the secondary side first arm circuit 307, and a deviation between the switching timings of the primary side second arm circuit 211 and the secondary side second arm circuit 311. These deviations are controlled to be equal to each other. In other words, the phase difference $\phi$ between U1 and U2 and the phase difference $\phi$ between V1 and V2 are controlled to identical values.

Hence, when, for example, an external signal requesting an operation in which the power conversion mode of the power supply circuit 10 is set at mode F is input, the power conversion mode determination processing unit 502 selects and sets mode F. The ON time $\delta$ determination processing unit 506 then sets the ON time $\delta$ to define a step-up ratio required when the primary side conversion circuit 20 is caused to function as a step-up circuit that steps up the voltage input into the second input/output port 60c and outputs the stepped-up voltage to the first input/output port 60a. Note that the secondary side conversion circuit 30 functions as a step-down circuit that steps down the voltage input into the third input/output port 60b at a step-down ratio defined in accordance with the ON time $\delta$ set by the ON time $\delta$ determination processing unit 506, and outputs the stepped-down voltage to the fourth input/output port 60d. Further, the phase difference $\phi$ determination processing unit 504 sets the phase difference $\phi$ such that the power input into the first input/output port 60a is transmitted to the third input/output port 60b in the desired power transmission amount P.

The primary side switching processing unit 508 performs switching control on the respective switching elements constituted by the primary side first upper arm U1, the primary side first lower arm /U1, the primary side second upper arm V1, and the primary side second lower arm /V1 to cause the primary side conversion circuit 20 to function as a step-up circuit and to cause the primary side conversion circuit 20 to function as a part of a DC-DC converter circuit.

The secondary side switching processing unit 510 performs switching control on the respective switching elements constituted by the secondary side first upper arm U2, the secondary side first lower arm /U2, the secondary side second upper arm V2, and the secondary side second lower arm /V2 to cause the secondary side conversion circuit 30 to function as a step-down circuit and to cause the secondary side conversion circuit 30 to function as a part of a DC-DC converter circuit.

As described above, the primary side conversion circuit 20 and the secondary side conversion circuit 30 can be caused to function as a step-up circuit or a step-down circuit, and the power supply circuit 10 can be caused to function as a bidirectional DC-DC converter circuit. Therefore, power conversion can be performed in all of the power conversion modes A to L, or in other words, power conversion can be performed between two input/output ports selected from the four input/output ports.

The transmitted power P (also referred to as the power transmission amount P) adjusted by the control unit 50 in accordance with the phase difference $\phi$ is power transmitted from one of the primary side conversion circuit 20 and the secondary side conversion circuit 30 to the other via the transformer 400, and is expressed as $$P = (N \times Va \times Vb)/(\pi \times \omega \times L) \times F(D, \phi) \qquad \text{Equation 1.}$$

Note that N is a winding ratio of the transformer 400, Va is the input/output voltage of the first input/output port 60a, Vb is the input/output voltage of the third input/output port 60b, $\pi$ is pi, $\omega(=2\pi \times f=2\pi/T)$ is an angular frequency of the switching operations of the primary side conversion circuit 20 and the secondary side conversion circuit 30, f is a switching frequency of the primary side conversion circuit 20 and the secondary side conversion circuit 30, T is the switching period of the primary side conversion circuit 20 and the secondary side conversion circuit 30, L is an equivalent inductance of the magnetic coupling reactors 204, 304 and the transformer 400 relating to power transmission, and F (D, $\phi$) is a function having the duty ratio D and the phase difference $\phi$ as variables and a variable that increases monotonically as the phase difference $\phi$ increases, independently of the duty ratio D.

The equivalent inductance L can be defined on the simple equivalent circuit of the transformer 400 connected to the primary side magnetic coupling reactor 204 and/or the secondary side magnetic coupling reactor 304. The equivalent inductance L is a combined inductance obtained by combining the leak inductance of the primary side magnetic coupling reactor 204 and/or the leak inductance of the secondary side magnetic coupling reactor with the leak inductance of the transformer 400 in the simple equivalent circuit.

For example, the equivalent inductance L (secondary side recalculated value $L_{EQ2}$) measured from the secondary side transformation circuit 30 can be represented as $$L_{EQ2} = 2L_1(1-k_1)N^2 + 2L_2(1-k_2) + L_{T2}(1-k_T^2) \qquad \text{Equation 2.}$$

$L_1$ is a self-inductance of the primary side magnetic coupling reactor 204, $k_1$ is a coupling coefficient of the primary side magnetic coupling reactor 204, N is a winding ratio of the transformer 400, $L_2$ is a self-inductance of the secondary side magnetic coupling reactor 304, $k_2$ is a coupling coefficient of the secondary side magnetic coupling reactor 304, $L_{T2}$ is an excitation inductance of the secondary side of the transformer 400, and $k_T$ is a coupling coefficient of the transformer 400. When the second input/output port 60c or the fourth input/output port 60d are not used, the leak inductance represented by the first or second term in Equation 2 can be absent.

However, since the dimensional tolerance of the core material and winding wire of the transformer 400 or the magnetic coupling reactors 204, 304 is comparatively large, there is a large spread in the coupling coefficients $k_1$, $k_2$, $k_T$ and self-inductance. As a result, a large spread can also occur in the equivalent inductance L. The spread in the equivalent inductance L generates a large spread in the transmitted power P.

Accordingly, for example, the control unit 50 or an inspection device (not shown in the figure) adjusts the angular frequency $\omega$ (in other words, the frequency f) according to the value of the equivalent inductance L. A change in the transmitted power P caused by the spread in the equivalent inductance L can thus be inhibited.

For example, the inspection device may be a device that is used in the inspection step included in the process for manufacturing the power supply apparatus 101 or the power supply circuit 10, or it may be a device (for example, an abnormality inspection tool) that is used when the power supply apparatus 101 is actually used (for example, upon installation on a vehicle) after shipping from a plant.

As follows from Equation 1, the transmitted power P is inversely proportional to the equivalent inductance L and also inversely proportional to the angular frequency ω. Therefore, as the value of the equivalent inductance L increases, the change in the transmitted power P is reduced by adjusting the angular frequency ω to a lower value. Conversely, as the value of the equivalent inductance L decreases, the change in the transmitted power P is reduced by adjusting the angular frequency ω to a higher value.

Therefore, for example, the control unit 50 or inspection device can inhibit the change in the transmitted power P by adjusting the angular frequency ω such that the product (=ω× L) of the angular frequency ω and the equivalent inductance L falls within a predetermined reference range. In other words, the control unit 50 or inspection device can inhibit the change in the transmitted power P by adjusting the frequency f such that the product (=f×L) of the frequency f and the equivalent inductance L falls within a predetermined reference range. Thus, the spread in the equivalent inductance L is canceled by the adjustment of the angular frequency ω (frequency f).

Figure 4:
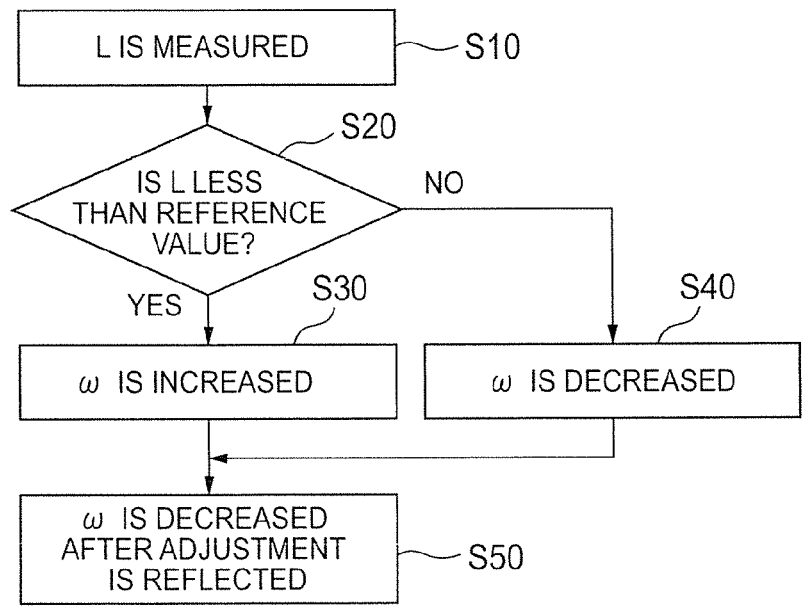
FIG. 4 is a flowchart showing an example of a power correction method according to the invention.

FIG. 4 is an example of a flowchart showing a method for correcting the transmitted power P. This correction method may be implemented by an inspection device in the inspection step included in a process for manufacturing the power supply apparatus 101 or the power supply circuit 10, or may be implemented by the control unit 50 or an inspection device such as an abnormality inspection tool in the actual usage environment (for example, upon installation on a vehicle) of the power supply apparatus 101.

Step S10 is a measurement step in which the inspection device or control unit 50 measures the equivalent inductance L. For example, the equivalent inductance L can be measured (estimated) by detecting the slope of the electric current flowing in the simple equivalent circuit of the transformer 400 connected to the primary side magnetic coupling reactor 204 and/or the secondary side magnetic coupling reactor 304 and the voltage applied to the simple equivalent circuit.

For example, in FIG. 1, the inspection device or the control unit 50 can calculate and estimate the equivalent inductance L on the basis of the slope of the input current Ib and the value of the input voltage Vb detected when the primary side first lower arm/U1, primary side second lower arm/V1, secondary side first upper arm/U2, and secondary side second lower arm/V2 are ON. Alternatively, the inspection device or the control unit 50 can calculate and estimate the equivalent inductance L on the basis of the slope of the input current Ib and the value of the input voltage Vb detected when the primary side first lower arm/U1, primary side second lower arm/V1, secondary side second upper arm/V2, and secondary side first lower arm/U2 are ON.

Where the primary side first lower arm/U1 and the primary side second lower arm/V1 are ON, the series circuit of the primary side coil 202 of the transformer 400 and the primary side magnetic coupling reactor 204 is short circuited. The slope of the input current Ib and the value of the input voltage Vb can be detected by the sensor unit 70 in this short-circuit state.

The inspection device or the control unit 50 can also calculate and estimate the equivalent inductance L on the basis of the slope of the input current Ia and the value of the input voltage Va detected when the secondary side first lower arm/U2, secondary side second lower arm/V2, primary side first upper arm/U1, and primary side second lower arm/V1 are ON. Alternatively, the inspection device or the control unit 50 can calculate and estimate the equivalent inductance L on the basis of the slope of the input current Ia and the value of the input voltage Va detected when the secondary side first lower arm/U2, secondary side second lower arm/V2, primary side second upper arm/V1, and primary side first lower arm/U1 are ON.

Where the secondary side first lower arm/U2 and the secondary side second lower arm/V2 are ON, the series circuit of the secondary side coil 302 of the transformer 400 and the secondary side magnetic coupling reactor 304 is short circuited. The slope of the input current Ia and the value of the input voltage Va can be detected by the sensor unit 70 in this short-circuit state.

Step S20 in FIG. 4 is a determination step in which the inspection device or control unit 50 determines the magnitude relationship between the measured value of the equivalent inductance L obtained in step S10 and a predetermined reference value Lo. For example, the inspection device detects whether or not there is a difference between the measured value of the equivalent inductance L and the reference value Lo by determining whether or not the measured value of the equivalent inductance L obtained in step S10 is less than the reference value Lo. Meanwhile, the control unit 50 detects whether or not the equivalent inductance L has changed with respect to the reference value Lo by determining whether or not the measured value of the equivalent inductance L obtained in step S10 is less than the reference value Lo.

The reference value Lo is, for example, the set value of the equivalent inductance L. The reference value Lo is not necessarily a fixed value and may be values specifying an allowed range between an upper-limit allowed value and a low-limit allowed value. The reference value Lo may be stored in advance in a predetermined storage device to be readable by the inspection device or the control unit 50.

Steps S30 and S40 are adjustment steps in which the inspection device or the control unit 50 adjust the angular frequency ω according to the measured value of the equivalent inductance L. The inspection device or the control unit 50 adjusts the angular frequency ω in the direction of increasing, so that "ω×L" matches a fixed value within a predetermined reference range, when it is determined that the measured value of the equivalent inductance L is less than the reference value Lo (step S30). Conversely, the inspection device or the control unit 50 adjusts the angular frequency ω in the direction of decreasing, so that "ω×L" matches the fixed value within the predetermined reference range, when it is determined that the measured value of the equivalent inductance L is greater than the reference value Lo (step S40).

It goes without saying that the inspection device or the control unit 50 may perform no adjustment of the angular frequency ω when the measured value of the equivalent inductance L matches the reference value Lo.

Further, in steps S30 and S40, the control unit 50 may adjust the angular frequency ω such that the transmitted power P converges to a target transmitted power Po. As a result, the transmitted power P can converge to the target transmitted power Po with a good accuracy.

Step S50 is a storage step in which the control unit 50 or inspection device stores the angular frequency ω adjusted in step S30 or S40 in a storage unit (for example, a volatile memory or a nonvolatile memory) configured in the control unit 50. The control unit 50 adjusts the transmitted power P by changing the phase difference φ according to Equation 1 reflecting the angular frequency ω after the adjustment, which has been stored in the storage unit. As a result, the transmitted power P can be corrected by adjusting the angular frequency ω even when there is a spread in the equivalent inductance L.

For example, even when the equivalent inductance L deviates in advance from the reference value Lo due to a spread in inductance among the components such as the transformers 400, the inspection device can inhibit a spread in transmitted power P among the power supply circuits 10 by adjusting the angular frequency ω prior to shipping from the plant. Further, for example, where the equivalent inductance L thereafter deviates from the reference value Lo due to deterioration with time of under the effect of ambient temperature, the control unit 50 or an inspection device such as an abnormality inspection tool can inhibit eventual changes in the transmitted power P by periodically adjusting the angular frequency ω in the actual usage environment.

Figure 5:
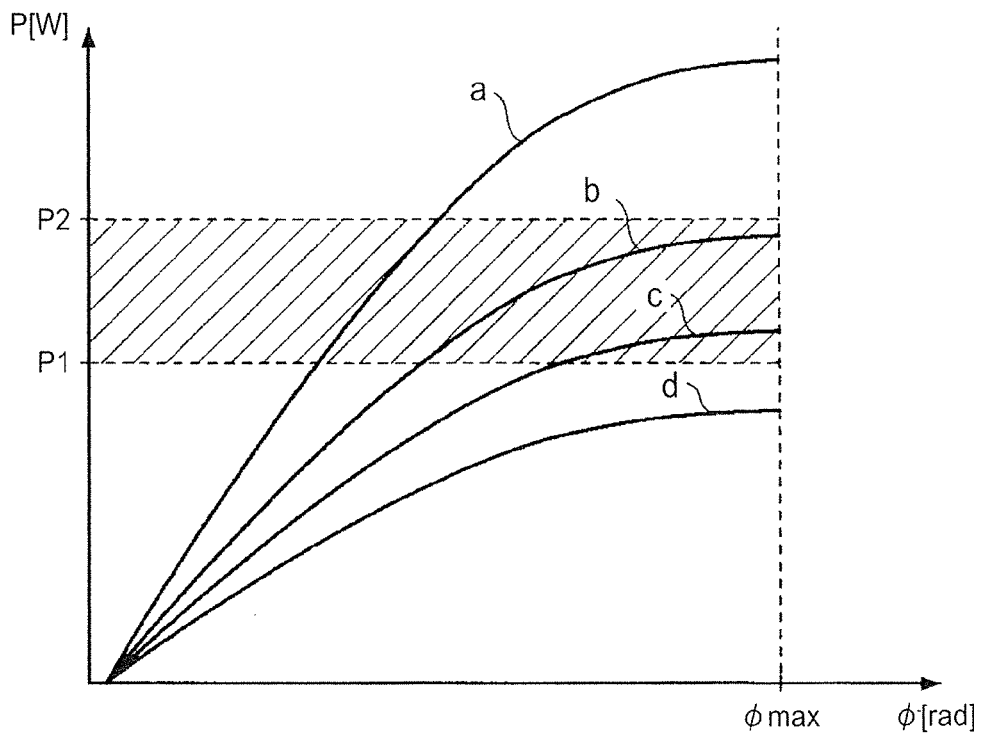
FIG. 5 is a graph showing the relationship between a transmitted power P and a phase difference $\phi$ according to this embodiment.

FIG. 5 is a graph showing the relationship between the transmitted power P and the phase difference φ. As follows from Equation 1, the transmitted power P increases monotonously with the increase in phase difference φ. The power curves a, b, c, d represent changes in the transmitted power P related to the phase difference φ when the angular frequency ω is fixed to a predetermined value. The power curves a, d represent changes in the transmitted power P before the correction, and the power curves b, c represent changes in the transmitted power P after the correction.

The inspection device or the control unit 50 adjusts the frequency ω such that the transmitted power P converges to a fixed value within a predetermined power range when the phase difference φ is matched with a predetermined value. As a result, the difference between the actual transmitted power P at a certain phase difference φ and the power that should be transmitted at this phase difference φ can be reduced. For example, the inspection device or the control unit 50 adjusts the frequency ω such that the transmitted power P converges to a fixed value within a predetermined power range (from P1 to P2) when the phase difference φ is matched with the upper limit value φmax that can be assumed by the phase difference φ. When the phase difference φ matches the upper limit value φmax, the transmitted power P assumes the maximum value Pmax thereof.

In the power supply circuit 10, the upper limit value φmax that can be assumed by the phase difference φ is determined from the standpoint of power conversion efficiency between the primary side conversion circuit 20 and the secondary side conversion circuit. When the phase difference φ matches the upper limit value φmax, the transmitted power P should be equal to or greater than the limit value P1 (maximum power required from the power supply apparatus 101) of the range that can be assumed by the target transmitted power Po even when the equivalent inductance L is greater than the reference value Lo.

Accordingly, the inspection device or the control unit 50 adjusts the angular frequency ω in the direction of decreasing, such that the transmitted power P becomes equal to or greater than the critical value P1, when the transmitted power P is detected to be less than the critical value P1 (power curve d) in the case in which the phase difference φ is matched with the upper limit value φmax. As a result, the maximum value Pmax of the transmitted power P can be corrected to a value equal to or greater than the critical value P1. This adjustment may be performed, for example, in step S40 in FIG. 4.

Meanwhile, the power curve a before the correction represents the case in which the equivalent inductance L is less than the reference value Lo. In the case of the power curve a before the correction, the maximum value Pmax of the transmitted power P is also equal to or greater than the critical value P1, but the variation rate of the transmitted power P in relation to the phase difference φ is large. Therefore, since even a small variation in the phase difference φ changes significantly the transmitted power P, the ripple current easily increases in the input/output ports, and the control resolution (adjustment width) of the transmitted power P in relation to the phase difference φ also easily increases.

Accordingly, the inspection device or the control unit 50 adjusts the angular frequency ω in the direction of increasing, such that the transmitted power P becomes equal to or less than the critical value P2, when the transmitted power P is detected to exceed the critical value P2 (>P1) in the case in which the phase difference φ is matched with the upper limit value φmax. As a result, the maximum value Pmax of the transmitted power P can be corrected to a value equal to or less than the critical value P2. This adjustment may be performed, for example, in step S30 in FIG. 4.

Thus, the inspection device or the control unit 50 can cause the maximum value Pmax of the transmitted power P to converge to a fixed value within the power range (from P1 to P2) by adjusting the angular frequency ω. Further, the inspection device or the control unit 50 can cause the variation rate of the transmitted power P relative to the phase difference φ to converge to a constant value within a predetermined variation rate range, by adjusting the angular frequency ω.

By so correcting the transmitted power P, it is possible to prevent the transmitted power P adjusted according to the phase difference φ from being lower or higher than the target transmitted power Po due to a spread in the equivalent inductance L. Further, the ripple current in the input/output ports can be reduced and the control resolution (adjustment width) of the transmitted power P in relation to the phase difference φ can be also reduced.

The transmitted power P and the variation rate thereof can be estimated, for example, on the basis of a detection value Yd outputted from the sensor unit 70 or another sensor unit (more specifically, the detection value outputted from the primary side voltage detection unit, primary side current detection unit, secondary side voltage detection unit, and secondary side current detection unit). For example, the inspection device or the control unit 50 may adjust each frequency ω by considering the input power or output power obtained from the detection value Yd as the transmitted power P, or may adjust each frequency ω by using the transmitted power P estimated from the input power or output power obtained from the detection value Yd.

An embodiment of the power conversion apparatus and power correction method was described above, but the invention is not limited to the above embodiment, and various amendments and improvements, such as combining or replacing the above embodiment either partially or wholly with another embodiment, may be implemented within the scope of the invention.

For example, in the above embodiment, a MOSFET, which is a semiconductor element subjected to an ON/OFF operation, was cited as an example of the switching element. However, the switching element may be a voltage control type power element using an insulating gate such as an insulated gate bipolar transistor (IGBT) or a MOSFET, or a bipolar transistor, for example.

Further, a power supply may be connected to the first input/output port 60a, and a power supply may be connected to the fourth input/output port 60d. Furthermore, a power supply need not be connected to the second input/output port 60c, and a power supply need not be connected to the third input/output port 60b.

What is claimed is:

1. A power conversion apparatus comprising:
   a primary side circuit;
   a secondary side circuit that is connected to the primary side circuit through a reactor and magnetically coupled thereto through a transformer; and
   a control unit configured to adjust power transmitted between the primary side circuit and the secondary side circuit by changing a phase difference between switching of the primary side circuit and switching of the secondary side circuit, and configured to adjust a frequency of switching of the primary side circuit and the secondary side circuit according to a value of an equivalent inductance of the reactor and the transformer,
   wherein the control unit increases the frequency when the equivalent inductance is less than a reference value, and decreases the frequency when the equivalent inductance is greater than the reference value.

2. The power conversion apparatus according to claim 1, wherein the control unit adjusts the frequency such that a product of the frequency and the equivalent inductance falls within a reference range.

3. The power conversion apparatus according to claim 1, wherein the control unit adjusts the frequency when a change in the equivalent inductance is detected.

4. The power conversion apparatus according to claim 1, wherein the control unit adjusts the frequency such that the transmitted power converges to target power.

5. The power conversion apparatus according to claim 1, wherein the control unit adjusts the frequency such that the transmitted power falls within a predetermined power range when the phase difference is a predetermined value.

6. The power conversion apparatus according to claim 5, wherein the predetermined value is an upper limit value that can be assumed by the phase difference.

7. The power conversion apparatus according to claim 1, wherein the control unit adjusts the frequency such that a maximum value of the transmitted power falls within a predetermined power range.

8. The power conversion apparatus according to claim 1, wherein the control unit adjusts the frequency such that a variation rate of the transmitted power relative to the phase difference falls within a predetermined variation rate range.

9. A power correction method for correcting power that is transmitted between a primary side circuit and a secondary side circuit that is connected to the primary side circuit through a reactor and magnetically coupled thereto through a transformer, and that is adjusted according to a phase difference between switching of the primary side circuit and switching of the secondary side circuit, the power correction method comprising:
   measuring an equivalent inductance of the reactor and the transformer; and
   adjusting a frequency of switching of the primary side circuit and the secondary side circuit according to a measured value of the equivalent inductance,
   wherein the frequency is increased when the equivalent inductance is less than a reference value, and the frequency is decreased when the equivalent inductance is greater than the reference value.

* * * * *

UNITED STATES PATENT AND TRADEMARK OFFICE
CERTIFICATE OF CORRECTION

| | | |
|---|---|---|
| PATENT NO. | : 9,276,484 B2 | Page 1 of 1 |
| APPLICATION NO. | : 14/282465 | |
| DATED | : March 1, 2016 | |
| INVENTOR(S) | : Jun Muto | |

It is certified that error appears in the above-identified patent and that said Letters Patent is hereby corrected as shown below:

Specification

In Column 4, Line 34, before "V1 and the primary side", delete "aim" and insert --arm-- therefor.

In Column 8, Line 54, after "primary side second lower", delete "aim" and insert --arm-- therefor.

In Column 11, Line 1, before "constituting the primary side", delete "anus" and insert --arms-- therefor.

Signed and Sealed this
Seventeenth Day of May, 2016

Michelle K. Lee
*Director of the United States Patent and Trademark Office*